United States Patent [19]

Buss et al.

[11] 4,025,498

[45] May 24, 1977

[54] VESSEL RESIDENCE TIME CONTROL

[75] Inventors: Russell A. Buss, Bartlesville, Okla.; Jerald N. Linsley, Houston, Tex.

[73] Assignee: Phillips Petroleum Company, Bartlesville, Okla.

[22] Filed: July 1, 1974

[21] Appl. No.: 484,691

[52] U.S. Cl. .......................... 260/95 A; 23/230 A; 235/151.12
[51] Int. Cl.² .......................................... C08F 6/00
[58] Field of Search ............... 23/230 A; 260/95 A; 235/151.12

[56] References Cited

UNITED STATES PATENTS

| 3,636,326 | 1/1972 | Smith et al. | 260/94.9 P |
|---|---|---|---|
| 3,711,457 | 1/1973 | Ayres | 260/94.9 P |
| 3,817,962 | 6/1974 | Smith et al. | 260/94.9 P |

*Primary Examiner*—Alan Holler

[57] ABSTRACT

The residence time of material within a vessel having an inlet, an outlet, and conveyor means for moving material from the inlet to the outlet is controlled in response to the level of material within the vessel adjacent the input stream to the vessel, the level of material within the vessel adjacent the output stream leaving the vessel, and the rate at which material is flowing from the vessel. The speed at which material is conveyed from the inlet of the vessel to the outlet thereof is controlled in response to the flow rate of material leaving the vessel, the level of material adjacent the outlet of the vessel, and the desired residence time of material within the vessel. The flow rate of material to the vessel is controlled in response to the amount of material leaving the vessel, the level of material adjacent the inlet of the vessel, and the desired residence time of material within the vessel.

22 Claims, 1 Drawing Figure

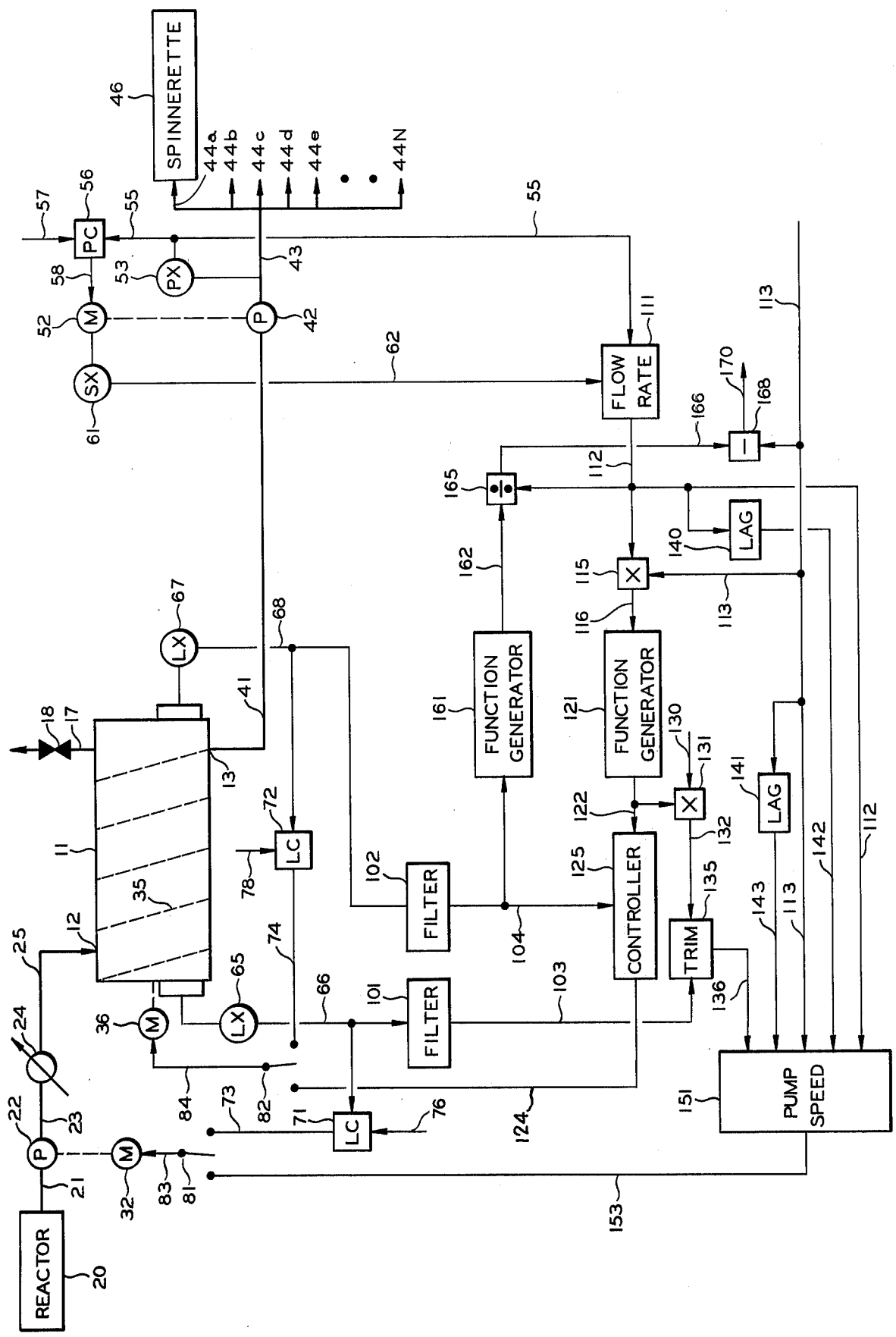

VESSEL RESIDENCE TIME CONTROL

This invention relates to the control of the residence time of a material within a vessel. In another aspect the invention relates to a method and apparatus for controlling the residence time of a polymeric material within a finishing vessel. In another aspect the invention relates to a method and apparatus for controlling the residence time of material within a vessel from which a demand flow of the material is provided to a subsequent apparatus or process.

In many chemical processes the residence time of a material within a vessel is determinative of the physical and chemical properties of the material. In many processes the residence time of a material within a vessel can be controlled simply by removing material from the vessel at a slower or faster rate to maintain the desired residence time. In some processes, however, alteration of the rate of flow out of the vessel is impractical from either a physical or an economic standpoint. An example of such a situation is a process in which a demand flow of material from the vessel must be provided to a subsequent process or a plurality of subsequent processes, with the amount of material removed from the vessel being dictated by the requirements of the subsequent process or processes. The necessity for a reliable residence time control system is of even more importance where a significant departure from a desired residence time within the vessel will result in an off-specification finished product and/or when the process taking place within the vessel is irreversible.

It is therefore an object of this invention to provide an apparatus and method for controlling the residence time of a material within a vessel. An additional object of the invention is to provide a method and apparatus for controlling the residence time of a polymeric material within a finishing vessel. A further object of the invention is to provide a method and apparatus for controlling the residence time of a material within a vessel from which a demand flow of the material is provided to a subsequent apparatus or process. Still an additional object of the invention is to provide a method and apparatus for adjustment of inventory within a vessel in response to a change in desired vessel residence time or a change in the rate at which material is removed from the vessel.

In accordance with the invention the residence time of material within a vessel is controlled by varying the rate at which material is added to the vessel and the rate at which material is conveyed from the inlet portion to the outlet portion of the vessel and without controlling the rate at which material is removed from the vessel. In order to accomplish this control, the method and apparatus of the invention provide for establishing a delivery flow signal representative of the flow rate of material from the outlet of the vessel, establishing an inlet level signal representative of the level of material within the vessel adjacent the inlet thereof, establishing an outlet level signal representative of the level of material within the vessel adjacent the outlet thereof, and establishing a set point signal representative of the desired residence time of material within the vessel. The rate at which material is delivered to the inlet of the vessel is then controlled in response to the delivery flow signal, the inlet level signal, and the residence time set point signal. The rate at which material is moved from the inlet portion of the vessel to the outlet portion of the vessel is controlled in response to the delivery flow signal, the outlet level signal, and the residence time set point signal. In addition to controlling the residence time of material within the vessel, the apparatus and method of the invention provide for stable vessel operation, provide for vessel inventory compensation when moving to a new outlet flow rate, and provide for vessel inventory compensation when moving to a new residence time set point.

Additional objects and advantages of the invention will be apparent from the specification, claims and the drawing in which the sole figure is a schematic block diagram of a vessel controlled by the method and apparatus of the invention.

Referring now to the drawing there is illustrated a vessel 11 having an inlet 12 and an outlet 13. Material enters the vessel 11 through a supply conduit 21, a pumping means 22, a conduit 23, a heating means 24, and an inlet conduit 25 communicating with the inlet 12 of the vessel 11. The pump means 22 is driven by a motor 32 or other suitable drive means. The material provided to the pump means 22 by the supply conduit 21 can be the product of a previous process such as a polymerization process taking place within a reactor 20, a mixture of ingredients to be reacted within the vessel 11, a material or mixture of materials undergoing a continuing chemical reaction or change, or any other similar material or mixture of materials. The conduit means comprising conduit 23, heater 24, and inlet conduit 25 connecting the pump means 22 to the inlet 12 of the vessel 11 can contain apparatus in addition to or in lieu of the heater 24 or can comprise a single conduit connecting the pump means 22 and the inlet 12.

Material is conveyed from the inlet 12 to the outlet 13 of the vessel 11 by a conveyor means such as a helical auger 35 driven by a motor 36 or other suitable drive means. Although a helical auger 35 is illustrated for use in conjunction with the horizontally oriented, generally cylindrical vessel 11 schematically illustrated, the use of other conveyor means with such a vessel or the use of various conveyor means with differently shaped or differently oriented vessels is within the scope of the invention.

Depending on the specific purpose of the vessel 11, various additional equipment may be associated with it. For example where a vapor product or byproduct is released by the material within the vessel, a conduit means 17 with a valve 18 or other flow regulating means can be used to remove the vapor material from the vessel 11. In other applications conduit means 17 could be connected to a source of pressure or vacuum in order to maintain a desired pressure within the vessel 11.

When the material entering the vessel 11 through the inlet 12 has been conveyed to the outlet 13, it is withdrawn from the vessel through an outlet conduit 41 by a delivery pump means 42 and is pumped through a main delivery conduit 43 and one or more output supply conduits 44a, 44b, 44c, 44d, 44e . . . 44N. Each output supply conduit 44a, 44b, 44c . . . 44N provides a supply of material to a spinnerette 46 or to a similar extruder, processor, reactor, packaging process, fabrication process, or the like. If desired, at least a portion of delivery pump means 42 can be located within the vessel 11 in order to aid in the desired removal of material from the vessel 11.

Pump means 42 is driven by a motor 52 or other suitable driving means. The pressure of material leaving the pump means 42 through the main conduit 43 is measured by a pressure transducer 53 which produces an output signal 55 representative thereof. A pressure controller 56 compares the pressure signal 55 with a pressure set point signal 57 and produces a control signal 58 which controls the speed of the motor 52 driving the pump means 42 in response to the difference between signal 55 and signal 57. The pressure within the main conduit 43 is thereby maintained at a desired level regardless of the amount of material flowing through the main delivery conduit 43 and output supply conduits 44a, 44b, 44c, . . . 44N. Control of the motor 52 by means of the control signal 58 will insure that the pressure within the main delivery conduit 43 is maintained at the desired set point level and that a flow of material sufficient to maintain the desired pressure is provided. A speed transducer 61 measures the speed at which the motor 52 is driving the pump means 42 and delivers a signal 62 representative thereof. Where the type of delivery pump means 42 employed or other considerations make it convenient or desirable to measure the speed of the pump directly rather than measuring the speed of the motor driving the pump, signal 62 can be generated directly in response to the speed of the pump means 42. Regardless of the exact method of generation, however, signal 62 is representative of the speed at which the pump means 42 is being driven.

A level transducer 65 measures the level of material within the vessel 11 adjacent the inlet 12 and produces a signal 66 representative thereof. Another level transducer 67 measures the level of material within the vessel 11 adjacent the outlet 13 and produces a signal 68 representative thereof. A level controller 71 generates a motor control signal 73 in response to the difference between the inlet level signal 66 and an inlet level set point signal 76. A level controller 72 generates a motor control signal 74 in response to the difference of the outlet level signal 68 with an outlet level set point signal 78. When motor control signals 73 and 74 are selected by switches 81 and 82 for use as motor control signals 83 and 84 respectively, the speed of the motor 32 driving pump means 22 is automatically controlled in response to the difference between the actual inlet level and the inlet set point level, and the speed of the motor 36 driving the helical auger 35 is automatically controlled in response to the difference between the actual outlet level and the outlet level set point. The speed of the motor 32 and pump means 22 is thereby increased when signal 66 indicates an inlet level less than the desired inlet level represented by signal 76 and is decreased when the inlet level is higher than the inlet set point level. In a similar manner the speed of the motor 36 and the helical auger 35 is increased when the outlet level is lower than desired and is decreased when the outlet level represented by signal 68 is higher than the outlet level represented by outlet set point signal 78.

Switches 81 and 82 can be either manually or automatically actuated for selecting between signals 73 and 153 to control the speed of motor 32 and between signals 74 and 124 to control the speed of motor 36. Switches 81 and 82 can operate together or can operate independently of each other and can be actuated in response to various process conditions and/or requirements. The use of signals 73 and 74 to control motors 32 and 36 respectively is preferably utilized as a backup control system and is ordinarily employed for actual control purposes when equipment failure or other similar circumstances preclude generation and selection of motor control signals 83 and 84 as hereinafter described.

The inlet level signal 66 is filtered by a filtering means 101 to produce a filtered inlet level signal 103. In a similar manner the outlet level signal 68 is filtered by a filtering means 102 to produce a filtered outlet level signal 104. The purpose of the filtering means 101 and 102 is to filter any noise in signals 66 and 68 as well as minor and/or insignificant level variations. Preferred filtering means 101 comprises a first order lag means which fulfills the equation:

$$L_{IF} = g_1 L_I$$

where $L_{IF}$ = filtered input level signal = signal 103; $L_I$ = inlet level signal = signal 66; and $g_1$ = lag time factor for inlet level signal filter. Preferred filtering means 102 comprises a first order lag means which fulfills the equation:

$$L_{OF} = g_2 L_O$$

where $L_{OF}$ = filtered outlet level signal = signal 104; $L_O$ = outlet level signal = signal 68; and $g_2$ = lag time factor for outlet level signal filter.

Although any first order lag employing first order lag time factors $g_1$ and $g_2$ known to those skilled in the art can be used, particularly useful lag time factors $g_1$ and $g_2$ are of the form:

$$1 - e^{-(t/T)}$$

where $e$ = 2.71828; $t$ = time; and $T$ = lag time constant.

Signal 55, representative of the pressure of the material delivered by the pump means 42, and signal 62, representative of the speed of the motor 52 driving the pump means 42, are utilized as inputs to an output flow rate calculating means 111 which generates a delivery flow signal 112 representative of the flow rate of material from the delivery pump means 42 through the main delivery conduit 43. In processes where the pressure delivered by the pump means 42 is known to be constant, a set point signal representative of such a pressure may be used in place of signal 55 as an input to the flow calculating means 111. Signal 112 is generated in response to signals 55 and 62 according to the equation:

$$Q = A_0 + A_1 S + A_2 P$$

where Q = delivery flow = signal 112; S = pump speed = signal 62; P = pump delivery pressure = signal 55, and $A_0$, $A_1$, and $A_2$ are constants. The constants utilized in the above equation can be readily determined by those skilled in the art for use with a particular process and its associated measuring and transducing equipment.

Where the flow rate, nature of the material, and other conditions within the main delivery conduit 43 are favorable, direct measurement of the flow rate of material through the main conduit 43 can be used to generate signal 112.

A residence time set point signal 113, representative of the desired residence time of material within the vessel 11 can be generated by any suitable means including, but not limited to, adjustment of a variable resistor to provide a suitable voltage or current signal, adjustment of the gain of an amplifier, or other similar techniques, either manual or automatic.

A vessel content weight calculating means 115, utilizing the delivery flow rate signal 112 and the residence time set point signal 113 as inputs, generates an output signal 116 representative of the desired weight of material inside the vessel 11 necessary to provide the proper vessel inventory required to maintain a residence time equal to the residence time set point. The desired vessel inventory weight signal is determined according to the equation:

$$W_C = b_1 T_S Q$$

where $W_C$ = desired weight of material residing in vessel = signal 116; $T_S$ = residence time set point = signal 113; Q = delivery flow = signal 112, and $b_1$ is a constant. Where changes in specific gravity of the material within the vessel may occur, the constant $b_1$ can be adjusted to correct for the change or, in cases where such changes are frequent and/or substantial, the specific gravity of the material within the vessel can be utilized as a separate variable input to the vessel content weight calculating means 115.

A function generating means 121 converts signal 116, representative of the desired weight of material within the vessel 11, to a signal 122 representative of the desired outlet level of material within the vessel 11 necessary to achieve the desired set point residence time, represented by signal 113, at the rate of flow represented by signal 112. The function generating means 121 is adapted to convert a weight signal to a level signal according to a capacity curve expressing the outlet level of material within the vessel in terms of the weight of material within the vessel. The function applied by the function generating means to signal 116 can be calculated in theoretical terms based upon the geometric configuration of the vessel and the physical characteristics of the material within it, or the function can be determined experimentally through observation and measurement of actual operating conditions. The function generating means 121 can be any of a number of such means, known to those skilled in the art, capable of generating an output signal 122 bearing a specific, but not necessarily linear, relationship to the input signal 116. One suitable function generating means is the diode function generator described in U.S. Pat. No. 3,549,998, the description of which is incorporated herein by reference.

Motor control signal generator 125 compares signal 122, representative of the desired outlet level, with signal 104 representative of the filtered actual outlet level, and generates a motor control signal 124 in response to the difference between signal 122 and signal 104. When signal 124 is selected, either automatically or manually, by switch 82 as the motor control signal 84 for the motor 36, the speed of the motor 36 is automatically adjusted to alter the residence time by changing the speed at which material is moved from the inlet 12 to the outlet 13 of the vessel 11 in response to a change in the outlet delivery flow, as represented by signal 112, and the corresponding alteration of the outlet level set point signal 122.

If the nature of the material within the vessel 11 is such that the specific gravity of the material at the inlet 12 is substantially different from the specific gravity of the material at the outlet 13, multiplying means 131 can be used to multiply signal 122 by a constant signal 130 to generate a desired inlet level set point signal 132. For a particular material within a particular vessel 11 the constant signal 130 which will provide an accurate conversion of signal 122 to signal 132 can be determined experimentally or by calculation. In a process wherein the material within the vessel 11 exhibits no relevant change in specific gravity as it is conveyed from the inlet 12 to the outlet 13 thereof, a multiplying means 131 is unnecessary and signal 122 can be used in place of signal 132.

A comparison means 135 compares the inlet level set point signal 132, representing the desired inlet level, with signal 103, representative of the filtered actual inlet level and responsive to the actual inlet level, and generates an inlet level trim signal 136 in response to the difference between signal 132 and signal 103.

A second order lag means 140 operates on signal 112 to provide a lagged flow rate signal 142. In a similar manner a second order lag means 141 operates on signal 113 to generate a lagged residence times set point signal 143. Lag means 140 and 141 can be first order, third order, or higher order lag means. Second order lag means, however, have been found to combine effectiveness with relative simplicity and are therefore preferred.

A feed pump speed control calculating means 151 generates a motor control signal 153 in response to signals 136, 143, 113, 142, and 112 according to the equation:

$$S_P = d_0 + d_1[Q + L_{TRIM} - K_{TRIM} + e_1 (T_S - T_{SL}) + e_2 (Q - Q_L)]$$

where $S_P$ = feed pump speed = signal 153; Q = delivery flow = signal 112; $Q_L$ = lagged delivery flow = signal 142; $L_{TRIM}$ = inlet level trim = signal 136; $K_{TRIM}$ = inlet level trim constant; $T_S$ = residence time set point = signal 113; $T_{SL}$ = lagged residence time set point = signal 143; $d_o$, $d_1$ are equation constants; and $e_1$, $e_2$ are gain factors. When signal 153 is selected, either automatically or manually, by switch 81 as the motor control signal 83 for motor 32, the speed of the pump means 22 will automatically respond to provide inlet flow to the vessel 11 adequate to maintain the demanded delivery flow and will also provide vessel inventory compensation for residence time set point changes, vessel inventory compensation for output flow demand changes, and front level feedback trim to correct for errors in predicted inventory compensation terms. The predicted inventory compensation terms can be adjusted by altering the gain factors and lag time constants associated with each inventory compensation term. A short lag time constant associated with a high gain factor would mean that extra inventory in the finisher tank would be accounted for in a shorter time, for example. In the same manner, a long lag time constant associated with a low gain factor would mean that extra inventory in the finisher tank would be accounted for over a long period of time.

Although the difference between the actual operating condition of the vessel 11 and the desired operating condition is reflected in the difference between signals 104 and 122, it is desirable in many circumstances to express this difference in terms of a difference between the desired residence time of material within the vessel 11 and the actual residence time as reflected by the measurement of variables associated with the operation of the vessel. For this purpose, a function generating means 161 can be utilized to convert the filtered outlet level signal 104 to a signal 162 representative of the actual weight of material contained within the vessel 11. The function generating means 161 can be of the same type as function generating means 121 and will, in fact, generate a function which is the mirror image or antilog of the function generated by function generating means 121.

A residence time calculating means 165 divides signal 162 by signal 112 to produce a calculated residence time signal 166 according to the equations:

$$T_C = W_{T/Q}$$

where $T_C$ = calculated residence time = signal 166; $W_T$ = weight of material in vessel based on outlet material level = signal 162; Q = delivery flow = signal 112.

A subtracting means 168 utilizing signals 113 and 166 as inputs determines the deviation between the residence time set point and the calculated residence time based on the outlet material level within the vessel according to the equation:

$$D = T_S - T_C$$

where D = residence time deviation = signal 170; $T_S$ = residence time set point = signal 113; and $T_C$ = calculated residence time based on outlet material level. Signal 170, which is produced by subtracting means 168 in response to the subtraction of signal 166 from signal 113, expresses the deviation of the conditions within the vessel 11 from desired conditions in terms of the residence time error. Signal 170 can be used for control of process conditions, if desired, and can be recorded to provide a permanent record of residence time variation. If desired, signals 166 and 113 could be utilized in place of signals 104 and 122 in the generation of signal 124 with appropriate scaling changes being made to adapt the motor control signal generator means 125 for use with signals 166 and 113 as inputs.

From the above description it can be seen that under steady state operating conditions not involving a change in residence time set point or a change in demand flow, the rate at which material is pumped to the inlet 12 of the vessel 11 will equal to the demand delivery flow rate. Under conditions not involving a change in residence time set point or a change in demanded output flow the rate at which material is conveyed from the inlet 12 to the outlet 13 of vessel 11 will be the only manipulated variable. The system will respond to changes in output flow demand by adjusting the amount of material entering the inlet 12 of the vessel 11 to account for a change in the necessary vessel inventory while moving to a new operating level to maintain the desired vessel residence time. When the residence time set point is changed, the system will again account for the deviation in vessel inventory as it moves the operation of the vessel to a new level to control residence time. Because the inventory compensation performed when a change in demanded output flow or residence time set point occurs is a predictive or feed-forward type of control, feedback trimming based on the vessel inlet material level is used to compensate for any error in calculation or other process conditions which would cause a deviation in the inlet material level.

Although the method and apparatus of the invention are useful in conjunction with many processes, their use is particularly advantageous when the vessel 11 is a finisher associated with a polymerization reaction. Such finishers are often used as the final step in preparing a polymer which has been removed from a polymerization reactor to be spun into fibers or filaments or otherwise used to produce a final product. In such a situation the output supply conduits 44a, 44b, 44c, . . . 44N would each supply a spinner or similar filament extruder with polymer from the finisher. Since the physical and chemical properties of the finished fibers or filaments in many such processes are dependent on the residence time of the polymer in the finisher, the method and apparatus of the invention minimize the change in residence time associated with the shutdown and/or restarting of one or spinners or extruders as a result of malfunction, required maintenance, or other similar conditions. The method and apparatus of the invention are particularly useful in conjunction with the production and spinning or extrusion of polycondensates such as nylon.

The various signals and signal generating means herein illustrated and described can be pneumatic, hydraulic, electric or other similar signals and signal generating means known in the art or a combination of various signal and signal generating means. The signals and signal generating means can embody either analog or digital apparatus and representations of the measurements and computations performed. Although implementation of the method and apparatus of the invention using electrical analog equipment is presently preferred, other equivalent apparatus can be utilized within the scope of the invention.

These and other reasonable variations and modifications are possible within the scope of the foregoing disclosure and the appended claims to the invention.

We claim:

1. A method for maintaining a desired residence time for material within a vessel having an inlet, an outlet, and means for moving material from said inlet to said outlet, said method comprising:
   establishing a delivery flow signal representative of the flow rate of said material from the outlet of said vessel;
   establishing an inlet level signal representative of the level of material within said vessel adjacent the inlet thereof;
   establishing an outlet level signal representative of the level of material within said vessel adjacent the outlet thereof;
   establishing a residence time set point signal representative of the desired residence time of material within said vessel;
   controlling the rate at which material is delivered to the inlet of said vessel in response to said delivery flow signal, said inlet level signal, and said residence time set point signal to provide a desired inventory of said material within said vessel; and
   controlling the rate at which said material is moved from the inlet of said vessel to the outlet of said vessel in response to said delivery flow signal, said outlet level signal and said residence time set point signal to provide a desired residence time of said material within said vessel.

2. A method in accordance with claim 1 additionally comprising:
   establishing an outlet level set point signal representative of the desired level of material within said vessel adjacent the outlet thereof in response to said delivery flow signal and said residence time set point signal; and establishing a first control signal in response to the difference between said outlet level signal and said outlet level set point signal;

and wherein controlling the rate at which said material is moved from the inlet of said vessel to the outlet of said vessel is accomplished in response to said first control signal.

3. A method in accordance with claim 1 additionally comprising:

establishing an inlet level set point signal representative of the desired level of material within said vessel adjacent the inlet thereof in response to said delivery flow signal and said residence time set point signal;

establishing an inlet level trim signal in response to the difference between said inlet level signal and said inlet level set point signal; and establishing a first control signal in response to said inlet level trim signal, said delivery flow signal, and said residence time set point signal;

and wherein controlling the rate in which material is delivered to the inlet of said vessel is accomplished in response to said first control signal.

4. A method in accordance with claim 3 additionally comprising:

establishing an outlet level set point signal representative of the desired level of material within said vessel adjacent the outlet thereof in response to said delivery flow signal and said residence time set point signal; and establishing a second control signal in response to the difference between said outlet level signal and said outlet level set point signal;

and wherein controlling the rate at which said material is moved from the inlet of said vessel to the outlet of said vessel is accomplished in response to said second control signal.

5. A method in accordance with claim 4 wherein establishing said delivery flow signal comprises:

establishing a delivery pressure signal representive of the delivery pressure of a pump means removing said material from the outlet of said vessel;

establishing a delivery speed signal representative of the speed at which said pump means is being driven; and establishing said delivery flow signal in response to said delivery pressure signal and said delivery speed signal.

6. A method in accordance with claim 5 wherein said material is a polymer.

7. A method in accordance with claim 6 wherein said polymer is a polycondensate.

8. Apparatus comprising:

a vessel having an inlet, an outlet and conveyor means for moving said material from the inlet of said vessel to the outlet thereof;

conduit means communicating with the inlet of said vessel;

feed pump means for delivering material through said conduit means to the inlet of said vessel;

delivery means associated with said outlet of said vessel for delivering material from the outlet of said vessel in response to the demand for said material;

means for establishing a delivery flow signal representative of the flow rate of said material from the outlet of said vessel;

means for establishing an inlet level signal representative of the level of material within said vessel adjacent the inlet thereof;

means for establishing an outlet level signal representative of the level of material within said vessel adjacent the outlet thereof;

means for establishing a residence time set point signal representative of the desired residence time of material within said vessel;

means for controlling the rate at which said material is delivered by said feed pump means in response to said delivery flow signal, said inlet level signal, and a said residence time set point signal to provide a desired inventory of said material within said vessel; and means for controlling the speed of said conveyor means in response to said delivery flow signal, said outlet level signal and said residence time set point signal to provide a desired residence time of said material within said vessel.

9. Apparatus in accordance with claim 8 wherein aid vessel comprises a finisher associated with a polymerization process.

10. Apparatus in accordance with claim 8 wherein said means for controlling the speed of said conveyor means comprises:

means for establishing an outlet level set point signal representative of the desired level of material within said vessel adjacent the outlet thereof in response to said delivery flow signal and said residence time set point signal;

means for establishing a first control signal in response to the difference between said outlet level signal and said outlet level set point signal; and means for adjusting the speed of said conveyor means in response to said first control signal.

11. Apparatus in accordance with claim 8 wherein said means for controlling the rate at which material is delivered to the inlet of said vessel comprises:

means for establishing an inlet level set point signal representative of the desired level of material within said vessel adjacent the inlet thereof in response to said delivery flow set point signal and said residence time set point signal;

means for establishing an inlet level trim signal in response to the difference between said inlet level signal and said inlet level set point signal;

means for establishing a first control signal in response to said inlet level trim signal, said delivery flow signal, and said residence time set point signal; and means for adjusting the rate at which material is delivered to the inlet of said vessel in response to said first control signal.

12. Apparatus in accordance with claim 11 wherein said delivery means comprises a delivery pump means and wherein said means for establishing a delivery flow signal comprises:

means for establishing a delivery pressure signal representative of the delivery pressure of said delivery pump means;

means for establishing a delivery speed signal representative of the speed at which said delivery pump means is being driven; and means for establishing said delivery flow signal in response to said delivery pressure signal and said delivery speed signal.

13. Apparatus in accordance with claim 12 wherein said means for controlling the speed of said conveyor means comprises:

means for establishing an outlet level set point signal representative of the desired level of material within said vessel adjacent the outlet thereof in response to said delivery flow signal and said residence time set point signal;

means for establishing a second control signal in response to the difference between said outlet level signal and said outlet level set point signal; and means for adjusting the speed of said conveyor means in response to said second control signal.

14. Apparatus in accordance with claim 13 wherein said vessel comprises a finisher associated with polymerization process.

15. A method in accordance with claim 1 wherein controlling the rate at which material is moved from the inlet of said vessel to the outlet of said vessel comprises:

generating, in response to said delivery flow signal and said residence time set point signal, an outlet level set point signal representative of the desired level of material within said vessel adjacent said outlet thereof; and controlling the rate at which material is moved from the inlet of said vessel to the outlet of said vessel in response to comparison of said outlet level signal with said outlet level set point signal; and wherein controlling the rate at which material is delivered to the inlet of said vessel comprises:

generating an inlet level set point signal representative of the desired level of material within said vessel adjacent the inlet thereof in response to said outlet level set point signal;

generating an inlet rate control signal in response to said inlet level set point signal, said delivery flow signal, and said residence time set point signal; and controlling the rate at which material is delivered to the inlet of said vessel in response to said inlet rate control signal.

16. Apparatus in accordance with claim 8 wherein said means for controlling the speed of said conveyor means comprises:

means for generating, in response to said delivery flow signal and said residence time set point signal, an outlet level set point signal representative of the desired level of material within said vessel adjacent said outlet thereof; and means for controlling the speed of said conveyor means in response to comparison of said outlet level signal with said outlet level set point signal; and wherein said means for controlling the rate at which said material is delivered by said feed pump means comprises:

means for generating an inlet level set point signal representative of the desired level of material within said vessel adjacent the inlet thereof in response to said outlet level set point signal:

means for generating an inlet rate control signal in response to said inlet level set point signal, said delivery flow signal, and said residence time set point signal; and controlling the rate at which material is delivered by said feed pump means in response to said inlet rate control signal.

17. A method for maintaining a desired residence time for material within a vessel having an inlet, an outlet, and means for moving material from said inlet to said outlet, said method comprising:

establishing a delivery flow signal representative of the flow rate of said material from the outlet of said vessel;

establishing an inlet level signal representative of the level of material within said vessel adjacent the inlet thereof;

establishing an outlet level signal representative of the level of material within said vessel adjacent the outlet thereof;

establishing a residence time set point signal representative of the desired residence time of material within said vessel;

generating an outlet level set point signal, representative of the desired level of material within said vessel adjacent the outlet thereof, in response to the product of said delivery flow signal and said residence time set point signal;

controlling the rate at which said material is moved from the inlet of said vessel to the outlet of said vessel in response to comparison of said outlet level signal and said outlet level set point signal to provide a desired residence time of said material within said vessel;

establishing an inlet set point signal which bears a constant relationship to said outlet level set point signal;

generating an inlet level trim signal in response to the difference between said inlet level signal and said inlet level set point signal;

generating a lagged delivery flow signal in response to said delivery flow signal;

generating a lagged residence time set point signal in response to said residence time set point signal; and controlling the rate at which said material is delivered to the inlet of said vessel in response to the sum of:

said delivery flow signal, the difference between said inlet level trim signal and air inlet level trim constant, the product of a first gain factor and the difference between said residence time set point signal and said lagged residence time set point signal, and the product of a second gain factor and the difference between said delivery flow signal and said lagged delivery flow signal, to provide a desired inventory of said material within said vessel.

18. A method in accordance with claim 17 wherein generating said outlet level set point signal comprises:

establishing a vessel inventory set point signal representative of the desired amount of material inside the vessel in response to the product of said delivery flow signal and said residence time set point signal; and generating said outlet level set point signal in response to said vessel inventory signal.

19. A method in accordance with claim 18 wherein controlling the rate at which said material is delivered to the inlet of said vessel comprises:

generating a control signal in accordance with the equation $$S_p = d_0 + d_1 [Q + L_{TRIM} - K_{TRIM} + e_1(T_S - T_{SL}) + e_2(Q - Q_L)]$$

where
$S_p$ = said control signal, $Q$ = said delivery flow signal,
$Q_L$ = said lagged delivery flow signal,
$L_{TRIM}$ = said inlet level trim signal,
$K_{TRIM}$ = said inlet level trim constant,
$T_S$ = said residence time set point signal,
$d_0, d_1$ = constants, and
$e_1, e_2$ = gain factors; and controlling the rate at which said material is delivered to the inlet of said vessel in response to said control signal.

20. Apparatus comprising:

a vessel having an inlet, an outlet and conveyor means for moving said material from the inlet of said vessel to the outlet thereof;

conduit means communicating with the inlet of said vessel;

feed pump means for delivering material through said conduit means to the inlet of said vessel;

delivery means associated with said outlet of said vessel for delivering material from the outlet of said vessel in response to the demand for said material;

means for establishing a delivery flow signal representative of the flow rate of said material from the outlet of said vessel;

means for establishing an inlet level signal representative of the level of material within said vessel adjacent the inlet thereof;

means for establishing an outlet level signal representative of the level of material within said vessel adjacent the outlet thereof;

means for establishing a residence time set point signal representative of the desired residence time of material within said vessel;

means for generating an outlet level set point signal, representative of the desired level of material within said vessel adjacent said outlet thereof, in response to the product of said delivery flow signal and said residence time set point signal;

means for controlling the speed of said conveyor means in response to the difference between said outlet level signal and said outlet level set point signal to provide a desired residence time of said material within said vessel;

means for generating an inlet level set point signal representative of the desired level of material within said vessel adjacent the inlet thereof in response to said outlet level set point signal;

means for generating an inlet level trim signal in response to the difference between said inlet level signal and said inlet level set point signal;

means for generating a lagged delivery flow signal in response to said delivery flow signal;

means for generating a lagged residence time set point signal in response to said resience time set point signal; and means for controlling the rate at which said material is delivered by said feed pump means in response to the sum of:

said delivery flow signal, the difference between said inlet level trim signal and an inlet level trim constant, the product of a first gain factor and the difference between said residence time set point signal and said lagged residence time set point signal, and the product of a second gain factor and the difference between said delivery flow signal and said lagged delivery flow signal, to provide a desired inventory of said material within said vessel.

21. Apparatus in accordance with claim 20 wherein said means for generating said outlet level set point signal comprises:

means for generating a vessel inventory set point signal representative of the desired amount of material within the vessel in response to the product of said delivery flow signal and said residence time set point signal; and means for generating said otlet level set point signal in response to said vessel inventory signal.

22. Apparatus in accordance with claim 21 wherein said means for controlling the rate at which said material is delivered by said feed pump means comprises:

means for generating a control signal in accordance with the equation $$S_p = d_0 + d_1 [Q + L_{TRIM} - K_{TRIM} + e_1(T_S - T_{SL}) + e_2(Q - Q_L)]$$

where
$S_p$ = said control signal,
$Q$ = said delivery flow signal,
$Q_L$ = said lagged delivery flow signal,
$L_{TRIM}$ = said inlet level trim signal,
$K_{TRIM}$ = said inlet level trim constant,
$T_S$ = said residence time set point signal,
$T_{SL}$ = said lagged residence time set point signal,
$d_0, d_1$ = constants, and
$e_1, e_2$ = gain factors; and means of controlling the speed of said feed pump means in response to said control signal.

* * * * *